United States Patent [19]

Burdi

[11] Patent Number: 5,144,546

[45] Date of Patent: Sep. 1, 1992

[54] FLASHLIGHT HOLDER

[75] Inventor: Steven Burdi, Palm Harbor, Fla.

[73] Assignee: Lumitech, Inc., Destin, Fla.

[21] Appl. No.: 829,216

[22] Filed: Feb. 3, 1992

[51] Int. Cl.$^5$ .............................................. F21L 7/00
[52] U.S. Cl. ..................................... 362/191; 362/72; 362/396; 224/41
[58] Field of Search ............... 362/190, 191, 396, 431, 362/72; 224/30 A, 41

[56] References Cited

U.S. PATENT DOCUMENTS

| | | | |
|---|---|---|---|
| 1,393,158 | 10/1921 | Pawsat | 362/72 X |
| 4,697,725 | 10/1987 | Miree | 362/72 X |
| 4,980,805 | 12/1990 | Maglica et al. | 362/191 X |

Primary Examiner—Stephen F. Husar
Attorney, Agent, or Firm—Arthur G. Yeager

[57] ABSTRACT

A clamp for attaching a flashlight to a bicycle handlebar, the clamp having a split-ring portion with screws for attaching the holder to the handlebar and a threaded hollow bushing portion to press against an O-ring to clamp a flashlight in the hollow of the bushing.

12 Claims, 1 Drawing Sheet

FLASHLIGHT HOLDER

BACKGROUND OF THE INVENTION

Bicycling is becoming more and more popular, both as a racing sport and as an exercise for body fitness. There are not enough bicycling paths to handle the growing numbers of bicyclers, and therefore, highways are commonly used for both bicycles and automobiles. For safety purposes as well as for lighting the way bicycles are now being equipped with small lightweight flashlights that provide an extraordinarily bright light from a small flashlight about 6 inches long and having a barrel about 0.75 inch in diameter.

There is in the prior art a flashlight holder for these new small flashlights. U.S. Pat. No. 4,980,805 discloses such a holder with a slotted spherical clamping member for holding the flashlight. This is more complex and more expensive than is necessary, and accordingly, there is a need for an improved holder.

It is an object of this invention to provide a novel improved flashlight holder. It is another object to provide a simple, inexpensive clamp for attaching a flashlight to a bicycle handlebar. Still other objects will become apparent from the more detailed description which follows.

BRIEF SUMMARY OF THE INVENTION

This invention relates to a flashlight holder for clamping a flashlight onto the handlebar of a bicycle, said holder, comprising two cylindrical bores disposed to be horizontally perpendicular to each other, a first bore comprising two generally semicircular bands detachably fastenable to each other by screw means and adapted to be fastened around a bicycle handlebar; and a second bore comprising an internally threaded support ring with an O-ring seated in a groove adjacent one end of the internal threads, and a hollow externally threaded bushing member adapted to engage said internal threads of said support ring and be advanced to bear against said O-ring, said hollow being slightly larger in diameter than the diameter of the barrel of said flashlight.

In specific and preferred embodiments of this invention the handlebar clamp includes two semicircular bands with a flange at each end permitting the two bands to be fastened to each other by screws through the flanges; and the bushing member which clamps the flashlight in place has an enlarged flange for finger gripping the bushing when clamping or releasing the flashlight therein.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE DRAWINGS

Figure 1:
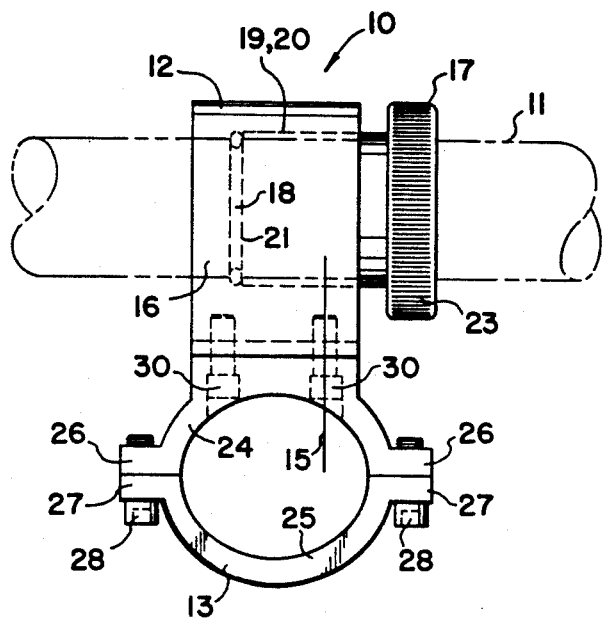
FIG. 1 is a side elevational view of the flashlight holder of this invention.
Figure 2:
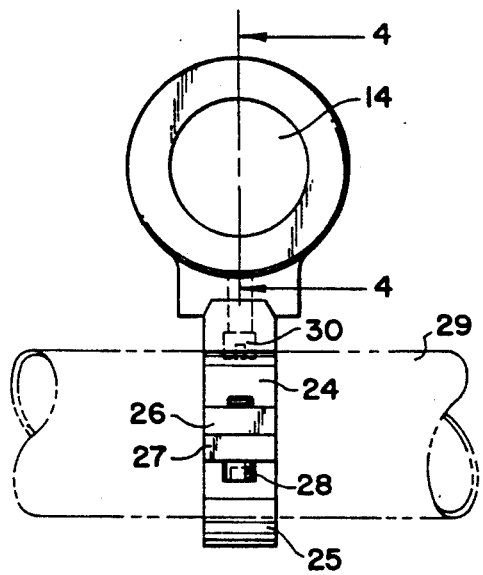
FIG. 2 is a front elevational view of the flashlight holder of this invention.
Figure 3:
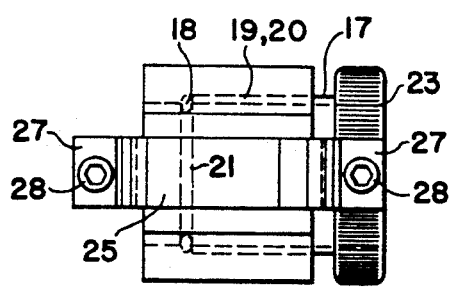
FIG. 3 is a bottom plan view of the flashlight holder of this invention.
Figure 4:
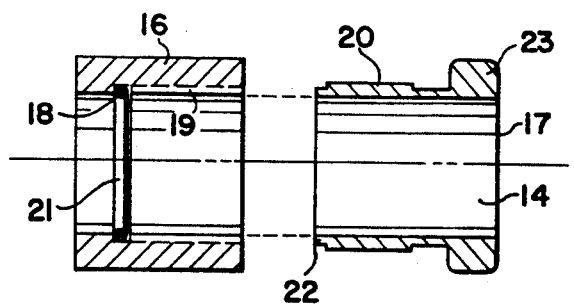
FIG. 4 is a cross sectional view taken at 4—4 of FIG. 2.

The features of this invention are best understood by reference to the accompanying drawings.

The flashlight holder 10 has a first bore 14 and a second bore 15 which are mutually perpendicular and are employed for clamping, respectively, to a flashlight barrel 11, and to a bicycle handlebar 29. As may be readily appreciated this arrangement permits the flashlight to shine in the direction longitudinal of the bicycle while the holder is attached to a handlebar which is lateral to the bicycle.

The holder of this invention is for convenience considered to comprise a flashlight clamping portion 12 and a handlebar clamping portion 13, although both are actually joined together into one rigid integral piece, by means of screws 30, by welding, or by any other suitable means.

Handlebar clamping portion 13 comprises two substantially semicircular bands 24 and 25 which preferably terminate their ends in a pair of flat flanges, 26 and 27, respectively. Such flanges 26 and 27 are releaseably joined together by screws 28, by a bolt-and-nut combination, or other rapid attachment means. In the preferred embodiment shown in the drawings, screws 28 are socket head machine screws which engage internal threads in a tapped hole in flanges 26 and pass through untapped holes in flanges 27. Preferably the exact internal shape of bands 24 and 25 is not semicircular, but rather oval or a combination of flat and curved surfaces which provide a positive wedging and clamping action when portions 24 and 25 are forced toward each other by the tightening of screws 28.

Flashlight clamping portion 12 is an assembly of three separate items; namely, a support ring 16, a bushing member 17, and an O-ring 18. Support ring 16 is a hollow member having internal threads 19 which engage external threads 20 of bushing member 17. Flange 23 of bushing member 17 is enlarged with grooving or knurling on its outside surface to facilitate turning of bushing member 17 by hand to advance it or withdraw it from internal threads 19. At the deepest end of threads 19 in support ring 16 is a groove 21 which is a seat for O-ring 18. At the forward end of bushing 17 is a tongue 22 which bears against O-ring 18 when bushing member 17 is advanced to about the end of threads 19. As tongue 22 presses against O-ring 18, it distorts the circular cross section of O-ring 18 into an oval shape which contacts and presses against flashlight barrel 11 clamping it into an immobile position. When bushing member 17 is unscrewed, the pressure on O-ring 18 is released permitting it to return to its circular shape through which flash-light barrel 11 can easily slide.

Preferably flashlight clamping portion 12 and handlebar clamping portion 13 are made of aluminum, although other metals or plastic are acceptable alternatives. O-ring 18 is made of a resilient rubber or plastic elastomer.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United State is:

1. A flashlight holder for clamping a flashlight to a cylindrical support in a mutually perpendicular relationship comprising a flashlight clamp portion and a support clamp portion, said support clamp portion including two generally semicircular portions attachable to each other so as to encircle a said cylindrical support; said flashlight clamp portion including a cylindrical bore with inside threading, a hollow bushing member with outside threading to engage said inside threading and a hollow to closely fit around said flashlight, and a resilient O-ring seated in a circular groove in said cylindrical bore and adapted to be compressed by advancement of said bushing.

2. The flashlight holder of claim 1 wherein said semicircular portions are divided and tapped to receive a pair of screws adapted to selectively tighten one semicircular portion against the other semicircular portion.

3. The flashlight holder of claim 1 wherein said O-ring is adapted to be distorted by the pressure of said bushing member such that the normal circular cross section of said O-ring is flattened into an oval shape extending radially inward to press against said flashlight and clamp it in said flashlight clamp portion.

4. A flashlight holder for clamping a flashlight onto the handlebar of a bicycle, said holder comprising two cylindrical bores disposed to be horizontally perpendicular to each other, a first bore comprising an internally threaded support ring with an O-ring seated in a groove adjacent one end of the internal threads, and a hollow externally threaded bushing member adapted to engage said internal threads of said support ring and be advanced to bear against said O-ring, said hollow being slightly larger in diameter than the diameter of the barrel of said flashlight, and a second bore comprising two generally semicircular bands detachably fastenable to each other by screw means and adapted to be fastened around a bicycle handlebar.

5. The holder of claim 4 wherein said screw means include internal threads in one of said semicircular bands and a machine screw to engage those internal threads.

6. The holder of claim 4 wherein said bushing member includes an enlarged flange with finger gripping means to facilitate manual turning of said bushing member.

7. A flashlight holder for clamping a flashlight to a cylindrical support in a mutually perpendicular relationship comprising a flashlight clamp portion and a support clamp portion, said support clamp portion including two generally semicircular portions attachable to each other so as to encircle a cylindrical support, said flashlight clamp portion including a housing member with a cylindrical bore, a hollow bushing member disposed partially within said bore and having a passageway therethrough which closely fits around a flashlight, thread means between said housing and bushing members to advance and retract said bushing member into and out of said cylindrical bore, said bore having an internal shoulder, and a resilient O-ring seated against said shoulder within said cylindrical bore, said bushing member having an inner end portion disposed spacedly away from said shoulder with said O-ring being sandwiched between said end portion of said bushing member and said shoulder, said O-ring being compressed by advancement of said bushing member into said bore to cause said O-ring to expand into said passageway to firmly grip and rigidly maintain a flashlight disposed therein.

8. The flashlight holder of claim 7 wherein said housing member includes an O-ring seat partially formed by said shoulder, said O-ring being distorted from its normal circular cross section by the force exerted thereon by said end portion of said bushing member to a flattened oval shape extending radially inward of said passageway to press against a flashlight and rigidly clamp it within said flashlight clamp portion.

9. The flashlight holder of claim 7 wherein each of said semicircular portions are tapped to receive a pair of screws adapted to selectively tighten one semicircular portion against the other semicircular portion.

10. The flashlight holder of claim 7 wherein said thread means include internal threads within said cylindrical bore and external threads on said inner end portion of said bushing member.

11. The flashlight holder of claim 10 wherein said bushing member includes an external end portion, and gripping means on said external end portion to rotate said bushing member to advance and retract said bushing member into and out of said cylindrical bore.

12. The flashlight holder of claim 10 wherein said external end portion is cylindrical and said housing member is substantially cylindrical, each of said external end portion and said housing member having a substantially equal cross-sectional shape aligned with each other.

* * * * *